United States Patent

[11] 3,553,391

[72] Inventors Dean C. Karnopp
Arlington;
John C. Heine, Cambridge, Mass.
[21] Appl. No. 696,399
[22] Filed Jan. 8, 1968
[45] Patented Jan. 5, 1971
[73] Assignee Bolt Beranek and Newman Inc.
Cambridge, Mass.
a corporation of Massachusetts

[54] SEALED MAGNETIC TAPE CARTRIDGE WITH TRANSDUCER GAP EMBEDDED WITHIN A WALL OF THE CARTRIDGE
1 Claim, 2 Drawing Figs.

[52] U.S. Cl. .......... 179/100.2
[51] Int. Cl. .......... G11b 5/24,
G11b 23/04
[50] Field of Search .......... 179/100.2Z

[56] References Cited
UNITED STATES PATENTS

| | | | |
|---|---|---|---|
| 2,476,599 | 7/1949 | Haloski .......... | 179/100.2 |
| 2,477,146 | 7/1949 | Scherbatskoy .......... | 179/100.2 |

*Primary Examiner*—J. Russell Goudeau
*Attorney*—Rines and Rines

ABSTRACT: This disclosure deals with a novel combination of magnetic tape cartridge with read or record head which permits magnetic coupling through the wall of the cartridge with no loss in the quality of the aperture of the head and with only a negligible loss in amplitude of the signal, as compared with the operation of conventional read-record heads, but with the distinct advantage that the cartridge, including drive and pinch rollers, is completely sealed against the outside environment.

DEAN C. KARNOPP
JOHN C. HEINE, INVENTORS

BY Rines and Rines
ATTORNEYS

SEALED MAGNETIC TAPE CARTRIDGE WITH TRANSDUCER GAP EMBEDDED WITHIN A WALL OF THE CARTRIDGE

The present invention relates to magnetic tape cartridges, being more specifically directed to cartridges of the type employing any of the standard means of tape storage, such as single-reel, double-reel, or random packed tape and the like.

Most standard cartridges must inherently expose the tape at two or more regions to the outside environment and the resulting deleterious effects of, for example, dust, dirt and moisture. One exposure region has been required in order to contact an external read-record head; and a second opening has been employed where the tape passes over a pinch roller which provides the tape drive when in contact with an external drive roller. A previously proposed means of eliminating the tape exposure for reading and recording has involved the placing of a read-record head inside each cartridge and transmitting signals through the cartridge walls electrically.

Since the read-record head is generally much more expensive than the cartridge, this proposed solution carries a heavy economic penalty. Another possibility is to keep the read-record head outside of the cartridge, but to try to read the tape through a thin section of the wall. This is not practically satisfactory, however, for several reasons, the most important of which is that the magnetic field associated with the gap in the read-record head is narrow only in the immediate vicinity of the gap and spreads rapidly even short distances from the head. Since width or effective aperture of the gap is the critical element in determining how short a wavelength on the tape may be recorded or read, the moving of the tape away from the head even a very short distance drastically reduces the information-storage density capabilities on the tape.

The principal object of the present invention, accordingly, is to provide an economical way to seal the cartridge without deterioration of the quality of the recording. In summary, this end is achieved by embedding the magnetic head gap in the cartridge itself, as well as the tape-driving mechanism.

Other and further objects will be explained hereinafter and will be more particularly delineated in the appended claims.

Figure 1:
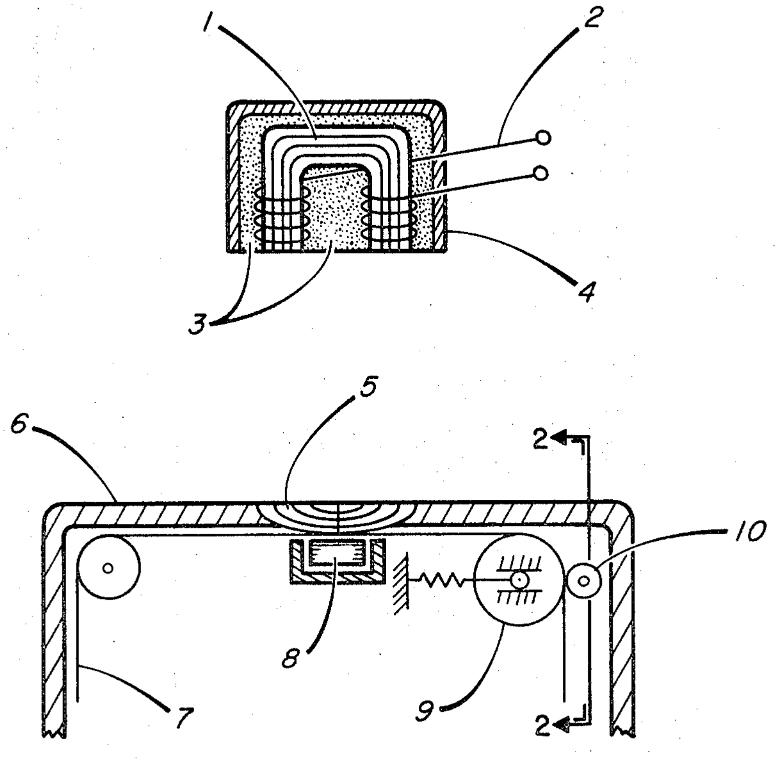
Figure 2:
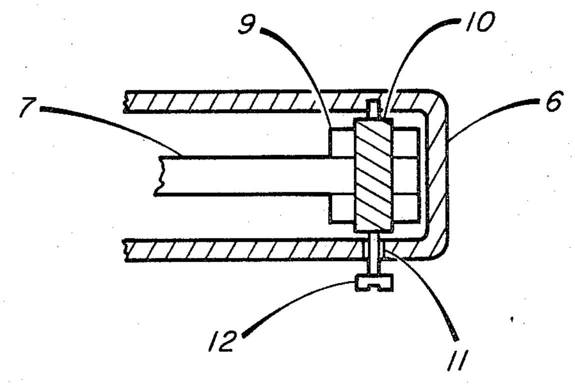

The invention will now be described with the aid of the accompanying partly schematic drawing in which FIG. 1 is a longitudinal section of a cartridge constructed in accordance with a preferred embodiment and shown cooperating with the recorder or reproducer head; and FIG. 2 is a fragmentary section, upon a somewhat enlarged scale, taken along the line 2–2 of FIG. 1, looking in the direction of the arrows.

Unlike conventional read-record heads, the head arrangement of the present invention that remains on the player or recorder consists only of a U-shaped magnetic core 1, wrapped with a winding, the external electric terminals of which are shown at 2. Multiple track heads would obviously include more than one magnetic path and more than one pair of such terminals. As in conventional practice, the core may be potted in plastic, as at 3, and enclosed in a magnetically shielded case 4. In contrast to prior heads, the narrow magnetic gap means used for recording or reading tape is not part of the head, but, rather, is imbedded at 5 in a predetermined portion (shown as the top) of the nonmagnetic wall 6 of the cartridge. When the arms of the read-record head 1—2 are positioned near the magnetic material of the gap 5 in the cartridge wall 6 with which it is to cooperate, the magnetic circuit is completed and the entire arrangement functions in the same manner as conventional heads. Since the area of contact between the core 1—2 and gap 5 may be made large, alignment problem is not severe and good magnetic coupling between the gap and the core is easily achieved.

In comparison with conventional heads, there is some increase in reluctance of the magnetic circuit where the gap material 5 meets the core 1—2 in the head. This results only in a nondeleterious decrease in signal amplitude transmitted; but even this can be compensated for by increasing the contact area. Since the tape 7 within the cartridge walls 6 is, as shown, in direct contact with the gap, no loss in the effective aperture of the gap 5 is experienced. A pressure pad 8 may be employed exactly in the same manner as in prior-art cartridges and the tape drive may be of conventional design, except that the spring-loaded pinch roller 9 and the drive roller 10 are both contained within the cartridge, with only one end of the drive roller 10 protruding through a rotary sealing member 11 in another portion of the cartridge wall 6 and coupled to a clutch member 12 engaging the external player-recorder drive when in operation.

It should be noted that for multiple track heads, the critical alignment of the head with the tape is accomplished within the cartridge. The alignment of the head with the cartridge may be made less critical by proper design of the magnetic paths in the gap material and in the head cores. It is to be understood that the detailed shape of the cartridge, the number of read-record heads and the manner of tape storage within the cartridge may all, of course, vary from application to application.

Further modifications will occur to those skilled in the art and all such are considered to fall within the spirit and scope of the invention as defined in the appended claims.

I claim:

1. A completely sealed magnetic tape cartridge for operating with a read-record magnetic head means, the cartridge being inclosed by a nonmagnetic wall and having, in combination, magnetic gap means embedded within a predetermined portion of the nonmagnetic wall of the cartridge and with an outer surface of the gap means exposed for cooperating with the head means, the cartridge being internally provided with a supply of planar magnetic tape and with a pressure pad disposed in contiguous alignment with an inner surface of the gap means, said tape being juxtaposed with said gap means and said pressure pad at its opposite sides, respectively, and being pressed against said inner surface of said gap means by said pressure pad, drive roll means disposed within the cartridge in engagement with said tape for passing said tape between said pressure pad and said inner surface of the gap means, spring-biased pinch roll means urging said tape against said drive-roll means, and drive-coupling means connected with the drive-roll means said head means comprising a U-shaped core the arms of which are positioned adjacent to said outer surface of said gap means, said core being potted within a magnetically shielded case having a flat face at which the ends of said arms are exposed, said cartridge wall having a flat face through which said outer surface of the gap means is exposed and which mates with the said flat face of the case of said head means.